United States Patent [19]
Johnson et al.

[11] Patent Number: 5,886,718
[45] Date of Patent: Mar. 23, 1999

[54] INK-JET OFF AXIS INK DELIVERY SYSTEM

[75] Inventors: Eric J. Johnson, Encinitas; Brian D. Gragg, San Diego, both of Calif.

[73] Assignee: Hewlett-Packard Company, Palo Alto, Calif.

[21] Appl. No.: 523,424

[22] Filed: Sep. 5, 1995

[51] Int. Cl.$^6$ .................................................. B41J 2/175
[52] U.S. Cl. ............................................................. 347/85
[58] Field of Search .................................... 347/85, 94

[56] References Cited

U.S. PATENT DOCUMENTS

| | | | |
|---|---|---|---|
| 4,422,084 | 12/1983 | Saito | 346/140 R |
| 4,833,491 | 5/1989 | Rezanka | 347/85 |
| 4,992,802 | 2/1991 | Dion et al. | 347/87 |
| 5,039,999 | 8/1991 | Winslow et al. | 347/85 |
| 5,359,353 | 10/1994 | Hunt et al. | 347/86 |
| 5,455,615 | 10/1995 | Burr et al. | 347/92 |
| 5,505,339 | 4/1996 | Cowger et al. | 347/86 |

FOREIGN PATENT DOCUMENTS

WO95/23703  9/1995  WIPO ............................. B41J 2/175

*Primary Examiner*—Safet Metjahic
*Assistant Examiner*—Michael Dalakis

[57] ABSTRACT

An off-axis ink delivery system for an ink-jet hard copy apparatus includes a multifunctional ink pump and flow switch device. A semipermanent, negative pressure, pen and printhead has a fluidic coupling to a static, refillable or replaceable, off-axis, ink reservoir via the ink pump and flow switch device.. The pen's mechanism for creating the negative pressure operational condition is used to pull ink from the reservoir when the ink pump and flow switch device is in an "open" position. Negative pressure reset, nozzle priming, pen air purging functions are also provided by the same ink pump and flow switch device. A system for each color ink is employed in the hard copy apparatus.

13 Claims, 4 Drawing Sheets

INK-JET OFF AXIS INK DELIVERY SYSTEM

RELATED APPLICATIONS

This application is related to U.S. patent applications Ser. Nos. 08/454975, filed May 31, 1995 by J. Scheffelin et al. For a CONTINUOUS REFILL OF SPRING BAG RESERVOIR IN AN INK-JET SWATH PRINTER/PLOTTER and 08/455478, filed May 31, 1995 by J. Bohorquez et al. for an INK-JET SWATH PRINTER WITH AUXILIARY INK RESERVOIR, each of which is incorporated herein by reference in its entirety.

BACKGROUND OF THE INVENTION

1. Field of the Invention

The present invention relates generally to ink-jet technology and, more specifically, to an off axis ink delivery system.

2. Description of the Related Art

The art of ink-jet technology is relatively well developed. Commercial products such as computer printers, graphics plotters, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions, incorporated herein by reference. Ink-jet devices are also described by W. J. Lloyd and H. T. Taub in *Output Hardcopy [sic] Devices*, chapter 13 (Ed. R. C. Durbeck and S. Sherr, Academic Press, San Diego, 1988).

Basically, it is known in thermal ink-jet printing to provide a printhead having an orifice plate in combination with heating elements. Thermal excitation of ink is used to eject droplets through tiny nozzles, or orifices, onto a print media. Dot matrix manipulation of the droplets provides alphanumeric character and graphics printing capabilities. Other ink-jetting mechanisms, such as by the use of piezo-electric transducers or wave propagation as ink droplet generators, are also well developed in the art.

The ink-jet pen itself may have a self-contained reservoir for storing ink and providing appropriate amounts of ink to the printhead during a printing cycle. These self-contained pens are also referred to in the art as print cartridges.

If a reusable pen rather than a print cartridge is employed in the hard copy apparatus, ink is generally supplied from a remote, off-axis (or off-board), ink reservoir to a relatively permanent pen body and printhead mechanism. Early ink-jet printers used off-axis reservoirs as demonstrated in U.S. Pat. No. 4,312,007 ((Winfield) assigned to the common assignee of the present invention and incorporated herein by reference). Moreover, it has been found that for some hard copy applications, such as large format plotting of engineering drawings and the like, there is a requirement for the use of much larger volumes of ink than can be contained within a reasonably sized, replaceable, print cartridge. Therefore, improved, relatively large, off-pen ink reservoir systems have also been developed more recently. As examples, refer to U.S. Pat. No. 4,831,389 (Chan) which shows a multicolor off-board ink supply system; U.S. Pat. No. 4,929,963 (Balazar) which demonstrates an ink delivery system for an ink-jet printer using a low pressure recirculating pumping system; and U.S. Pat. No. 4,968,998 (Allen) which teaches an ink-jet pen which is refillable at a service station (each assigned to the common assignee of the present invention and incorporated herein by reference).

While both print cartridges and ink-jet pens provide a reliable and efficient means of "jetting" droplets of ink from the printhead onto the print medium, the printheads generally require a mechanism to prevent the free flow of ink through the orifices when the printhead is not activated. Without such control, ink may leak, or "drool," onto the printing surface or into the printer mechanism. Such leaking ink may also build up and cake on the printhead itself, impairing proper operation. Complex pen service stations are often provided as part of the hard copy apparatus where printheads can be wiped or activated to "spit" away excess ink (known as priming). An exemplary service station is disclosed in U.S. Pat. No. 4,853,717 ((Harmon et al.) assigned to the common assignee of the present invention and incorporated herein by reference).

To alleviate this problem, many ink-jet printers supply ink from the reservoir to the printhead at a slight under pressure, lower than the ambient atmospheric pressure at the printhead (also referred to in the art as "back-pressure" or "negative pressure" operation). To be effective, pen back-pressure must be maintained consistently and predictably within a desired operating range. That is, the pen back-pressure must be large enough to prevent the unwanted free flow of ink through the orifices when the pen is not in use, yet at the same time small enough so that the printhead, when activated, can overcome the back-pressure and eject ink droplets in a consistent and predictable manner. This back-pressure will be affected by changes in either or both the ambient atmospheric and the pen's internal pressure conditions. Likewise, temperature variations may cause the ink and air within the ink-jet pen to contract or expand, also affecting the back-pressure. In addition to such operational variations, shipping print cartridges by air cargo often subjects them to extreme temperature and atmospheric pressure excursions. Therefore, these factors must be accounted for and a mechanism incorporated into an ink-jet pen to maintain the back-pressure within the predetermined, desirable operating range.

U.S. Pat. No. 4,771,295 ((Baker et al.) assigned to the common assignee of the present invention and incorporated herein by reference) shows a print cartridge employing an ink saturated foam where the capillary effect of the foam maintains the requisite back-pressure.

In order to increase print cartridge ink capacity, free-ink reservoirs have also been developed. In its basic aspect, a free-ink print cartridge apparatus includes a flexible bag that is spring loaded such that a predetermined design back-pressure is constantly provided during depletion of ink from the reservoir.

U.S. Pat. No. 4,509,062 (Low et al.), entitled "Ink Reservoir With Essentially Constant Negative Back Pressure" (assigned to the common assignee of the present invention and incorporated herein by reference) and U.S. Pat. No. 5,325,119 (Fong), entitled "Variable Rate Spring Ink Pressure Regulator for a Thermal Ink Jet Printer" (assigned to the common assignee of the present invention and incorporated herein by reference) teach particular mechanisms for dealing with back-pressure regulation in free-ink print cartridges. U.S. patent application Ser. Nos. 08/065,957 (Seccombe et al.) and 08/331,453 (Pawlowski Jr. et al.)(both assigned to the assignee of the present invention and incorporated herein by reference), disclose further inventions related to the spring bag concepts as employed in print cartridges.

In the quest for providing hard copy apparatus with the capability of higher print resolution (for example, 1200 dot per inch, near-photograph quality graphics) and for providing large format print graphics users with a reliable source of a greater volumes of ink than can be provided in reasonably sized, disposable print cartridges, there is a need for a system which employs a refillable, off-axis ink reservoir that is compatible with a relatively permanent pen and printhead that operates using the back-pressure concept.

SUMMARY OF THE INVENTION

In its basic aspects, the present invention provides an ink delivery system for a hard copy apparatus, including: an ink-jetting mechanism, mounted within said hard copy apparatus and including a printhead and an ink accumulator coupled to said printhead providing printhead back-pressure regulation, for jetting ink onto print media adjacent thereto; an off-axis ink storage mechanism for containing a supply of ink for the ink-jetting mechanism; and an ink pumping and flow switching mechanism, fluidically coupling the ink-jetting mechanism to the ink storage mechanism, for controlling the refilling of the ink accumulator of the ink-jetting mechanism and for resetting the ink accumulator to a predetermined back-pressure set point following refilling of said ink accumulator.

The multifunctional ink pumping and flow switching mechanism further is adaptable to use as a mechanism for priming the printhead and for purging the pen of air or ink vapor gas.

A color hard apparatus is also provided for by using one embodiment for each color ink.

It is an advantage of the present invention that it leverages proven spring bag back-pressure regulation technology to refill an on-axis ink accumulator for the printhead from an off-axis ink reservoir.

It is yet another advantage of the present invention that it provides a single, multi-functional, ink transfer mechanism for transferring ink from an off-axis reservoir to an ink-jet pen.

It is a further advantage of the present invention that it reduces the cost of manufacture through the integration of several ink pumping functions, including that used for refilling, priming, purging, and a mechanism for establishing back-pressure, into a single device.

It is still another advantage of the present invention that it provides a self-calibrating ink-jet pen refill operation.

It is yet another advantage of the present invention that it provides for use of a simple off-axis ink reservoir that does not require any pressurization mechanism.

It is still another advantage of the present invention that it is scalable to a variety of hard copy apparatus size and ink usage rate design factors.

It is another advantage of the present invention that it is adaptable to existing spring bag back-pressure manufacturing, supply, and engineering capabilities.

It is a further advantage of the present invention that it results in a lower cost per page of print by allowing the use of a permanent pen and printhead and a permanent ink transfer device in conjunction with a refillable or replaceable ink reservoir.

It is another advantage of the present invention that it reduces piece part count for an off-axis ink reservoir ink-jet hard copy apparatus compared to prior art off-axis ink reservoir systems.

It is yet another advantage of the present invention that it allows flexibility in hard copy apparatus shipping alternative strategies.

Other objects, features and advantages of the present invention will become apparent upon consideration of the following detailed description and the accompanying drawings, in which like reference designations represent like features throughout the drawings.

BRIEF DESCRIPTION OF THE DRAWINGS

FIGS. 3A through 3D demonstrate four operational modes of the ink pump and flow switch component of the present invention as shown in FIG. 2 in which:

FIG. 3A shows the ink pump and flow switch component in its fluid switch open position;

FIG. 3B shows the ink pump and flow switch component in its back-pressure reset position;

FIG. 3C shows the ink pump and flow switch component in its closed position; and FIG. 3D shows the ink pump and flow switch component in its positive pressure, pump forward position.

The drawings referred to in this description should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
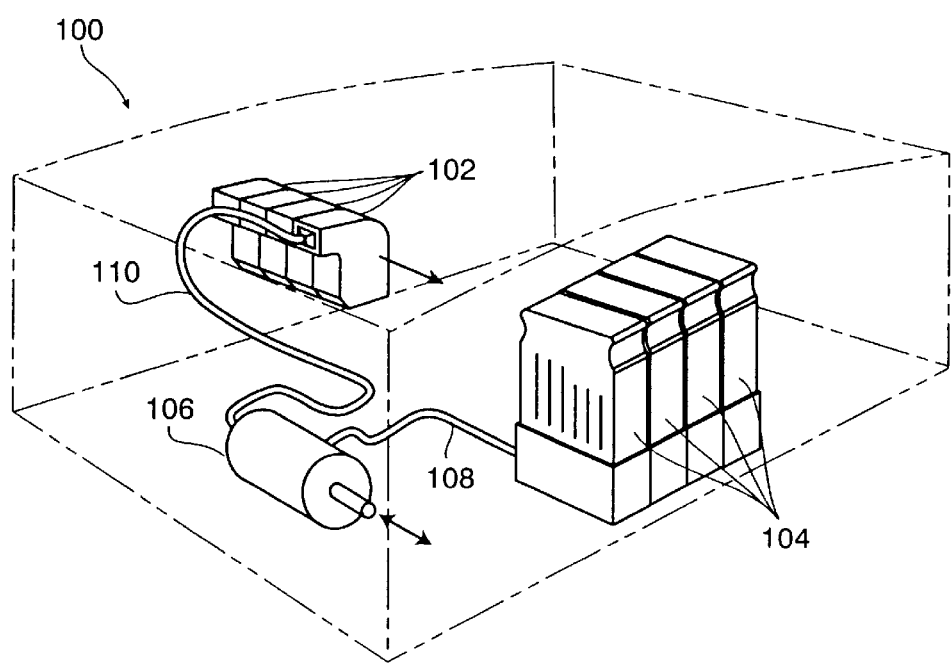
FIG. 1 is a schematic, perspective drawing of an off-axis ink delivery system in accordance with the present invention.

A spring bag based, free-ink ink-jet pen, off-axis ink delivery system in accordance with the present invention as depicted in FIG. 1 is deployed within an ink-jet hard copy apparatus 100 (phantom line representation). A variety of such apparatus is well-known and the above-cited reference material can be reviewed as background for details thereof.

One or more spring-bag based pens 102 are mounted in a moving (representative arrow) carriage mechanism (not shown) for transversing print media (not shown) transported into juxtaposition with the pens 102 by other mechanisms (not shown) of the hard copy apparatus 100 as would be known in the art. In full-color, ink-jet printing apparatus, it is known to provide either a single, multi-chambered, pen for the cyan, yellow, magenta, and black ("CMYK") inks usually employed, or to provide up to four individual pens 102 as shown in FIG. 1. The pens 102 of the preferred embodiment of the present invention are of the spring bag type.

Because ink is to be provided from an off-axis reservoir to each pen 102, it is contemplated that each pen 102 be designed to have a minimum physical size for a predetermined hard copy apparatus printing parameters. For example, in a portable hard copy apparatus, such as a printer to accompany, or to be built into, a notebook personal computer, it is likely that the end user will most often be printing only a few pages of text during each particular print job. However, in an engineering drawing plotter, it is probable that each print job will use a relatively large volume of ink. The portable hard copy apparatus should have a small pen and printhead device and a small, on-board, ink accumulator spring bag to accommodate the few pages of text job. The plotter should have a pen and printhead device to accommodate large swath printing in order to reduce the print time and an onboard ink accumulator spring bag to handle the larger volume of ink needed in each swath without requiring a job interruption to refill the accumulator.

The particular hard copy apparatus design can be approached by determining how may pages should be printed between on-board ink accumulator spring bag refill cycles. If a refill cycle is to occur no more frequently than after a single page at full coverage, that is, every pixel is dotted with ink (which may be equivalent to multiple pages at a low percent coverage as one would expect for text-only type printing where true coverage is generally about five percent), then a minimum on-board ink accumulator spring bag volume is determinable. Computing how much ink is expected to be used on a single page at full coverage printing:

$$\text{volume/page} = dpi^2 * \text{volume/drop} * \text{area/page},$$

where:
volume/page=volume of ink user per page (per color),
dpi=dots per inch resolution,
volume/drop=volume of ink per drop fired, and
area/page=printable area on a page.

Another methodology for determining how to size an onboard ink accumulator spring bag is to relate the needed minimum pen width to accommodate a particular printhead (based on the number and spacing of nozzles and orifices as would be known in the art) to an adaptable spring bag configuration. For example, assume a particular pen width is set at fifteen millimeters. A swept volume by diameter, one-inch diameter, spring plates mounted to bias the spring bag to a particular back-pressure set point within the fifteen millimeter sweep limit would be approximately 7.6 cubic centimeters. In a current six hundred dpi hard copy apparatus, jetting a thirty-five picoliter droplet onto an eighty five square inch printable area (8½×11 inch standard paper with standard margins), six pages could be printed in blackout and over one-hundred twenty pages at a five percent coverage between refill cycles. Total on-axis ink volume, including printhead snout regions and unswept bag regions would result in close to ten cubic centimeters of ink on-board following a pen refill cycle.

An off-axis ink reservoir 104 is provided for each pen 102 of the system. Again, the particular configuration is dependent on the form of the hard copy apparatus 100. An ink-jet facsimile machine design may require only one pen 102 and thus have one, relatively large, off-axis ink reservoir 104. A full ink-jet color printer may have four pens 102 and four off-axis ink reservoirs 104 as depicted in FIG. 1. Whatever the particular configuration, the off-axis ink reservoir 104 may be refillable or a replaceable cartridge type. It should be specifically noted that in accordance with the present invention as further described with respect to FIG. 2 below, the ink reservoir 104 does not require any positive pressure mechanisms.

The third basic component of the present invention is a permanent, multifunctional, ink pump and flow switch device 106. This ink pump and flow switch device 106 provides four functions:

(1) to allow flow of ink between the off-axis ink reservoir 104 and the pen 102, (2) to cut-off flow of ink between the off-axis ink reservoir 104 and the pen 102, (3) to periodically set an initial back-pressure in the spring bag mechanism within the pen 102, and (4) to provide positive pressure to the pen 102, enabling air purging and positive pressure priming of the pen 102.

Ink conduits, such as flexible tubings (or other suitable ink conduit as would be known in the art) 108, 110 provides a fluidic coupling between the off-axis ink reservoir 104 and the ink pump and flow switch device 106 and between the ink pump and flow switch device 106 and the pen 102, respectively.

For a full color apparatus, e.g., a CYMK printer, one of each of the system components and appropriate tubing is required for each color ink.

Figure 2:
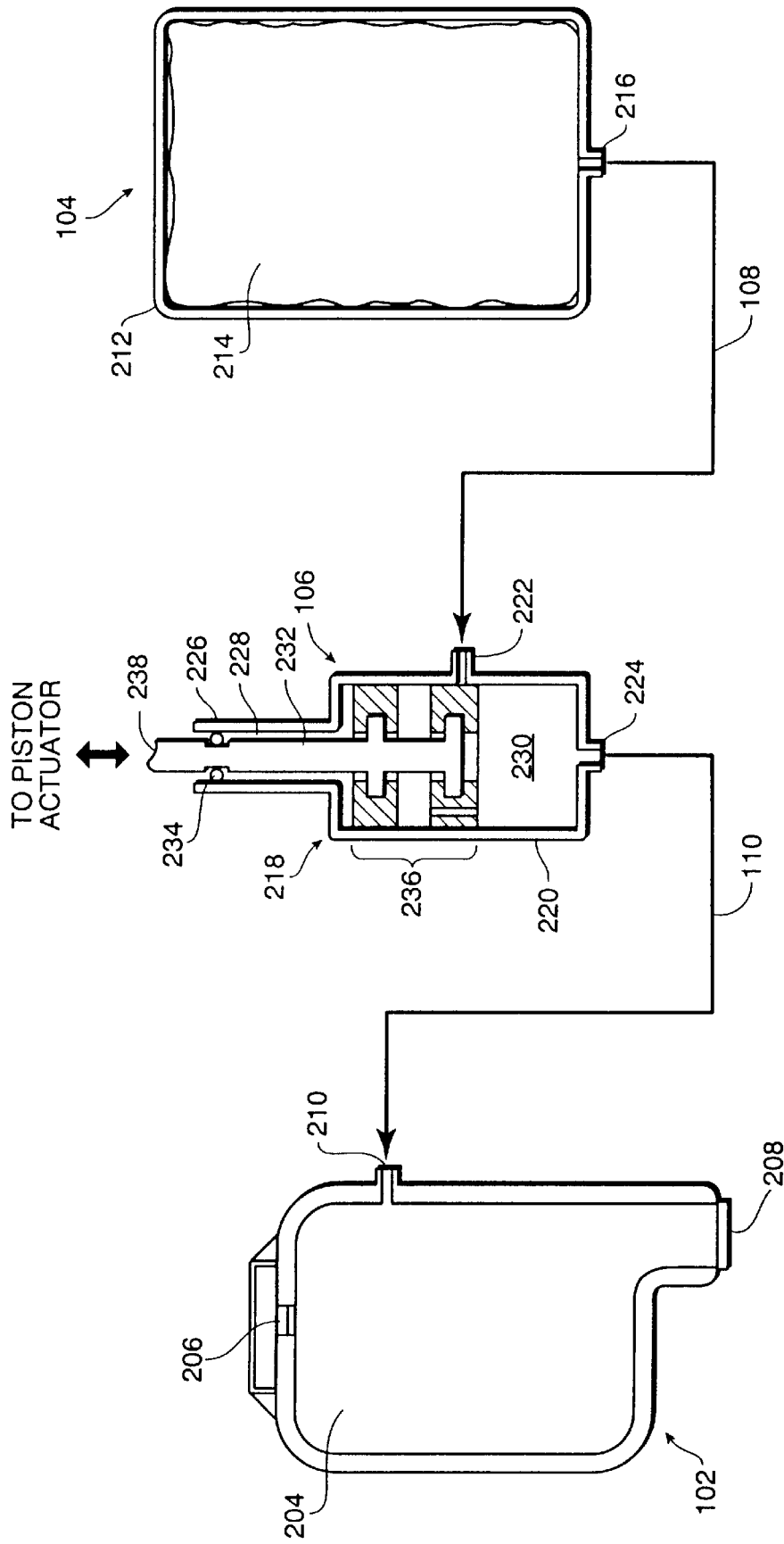
FIG. 2 is a schematic detail drawing of the components of the present invention as shown in FIG. 1 for a single color ink system.

Referring now to FIG. 2, a more detailed depiction of the off-axis ink delivery system is shown for one ink color. The pen 102 has a housing that contains a spring bag ink accumulator 204. Reference can be made to U.S. Pat. No. 5,325,119 and other above-referenced U.S. Patents and applications for details regarding the spring bag type pen 102. An air purge port 206, a printhead 208, and an ink transfer port 210 features of the pen 102 are shown to facilitate explanation of the present invention.

The off-axis ink reservoir 104 includes a housing 212 that contains an ink supply 214. Such remote ink supply mechanisms are well known in the art; in a disposable ink cartridge form, the mechanism may be as simple as a plastic housing having a non-reactive, ink-impermeable material bag contained within. An ink outlet port 216 is provided. If the ink supply is in a flaccid, ink-filled collapsible bag contained within a rigid housing 212 as shown, the ink containment chamber of the housing of the off-axis ink reservoir 104 does not need to be vented to the ambient atmospheric pressure. In the alternative, if the rigid housing 212 itself is used to contain the ink, such a vent is provided.

The ink pump and flow switch device 106 has a casing 218 that includes a cylinder 220, formed of a suitable rigid material, such as a polysulfone plastic, stainless steel, or other material which does not chemically react with the ink. An ink inlet port 222 is coupled by tubing 108 to the ink outlet port 216 of the off-axis ink reservoir 104. An ink pumping port 224 is coupled by tubing 110 to the ink transfer port 210 of the pen 102. The casing 218 also includes a piston shaftway member 226 having a central bore 228 opening into a central chamber 230 of the cylinder 220. A piston shaft 232, riding on a fluid tight bearing 234, such as an O-ring or the like, is coupled to a piston head 236 within the central chamber 230 of the cylinder 220. A distal end 238 of the piston shaft 232 is coupled through central chamber region 230" to a piston actuator (not shown). The piston actuator can be any mechanical or electromechanical, linear actuation apparatus for causing a push-pull force on the piston shaft 232 and thus moving the piston head 236 within the cylinder 220.

Figure 3:
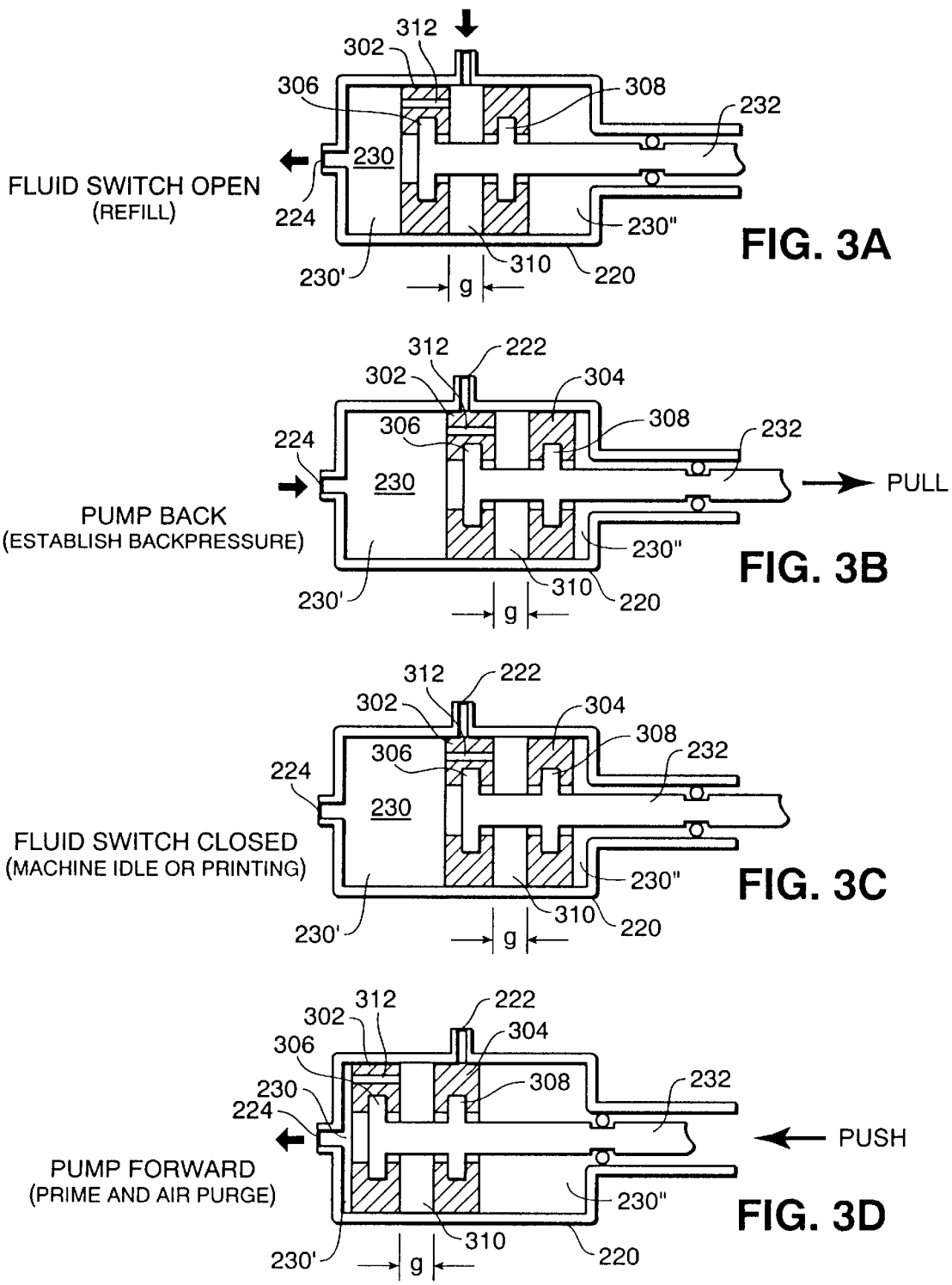
Figure 4:
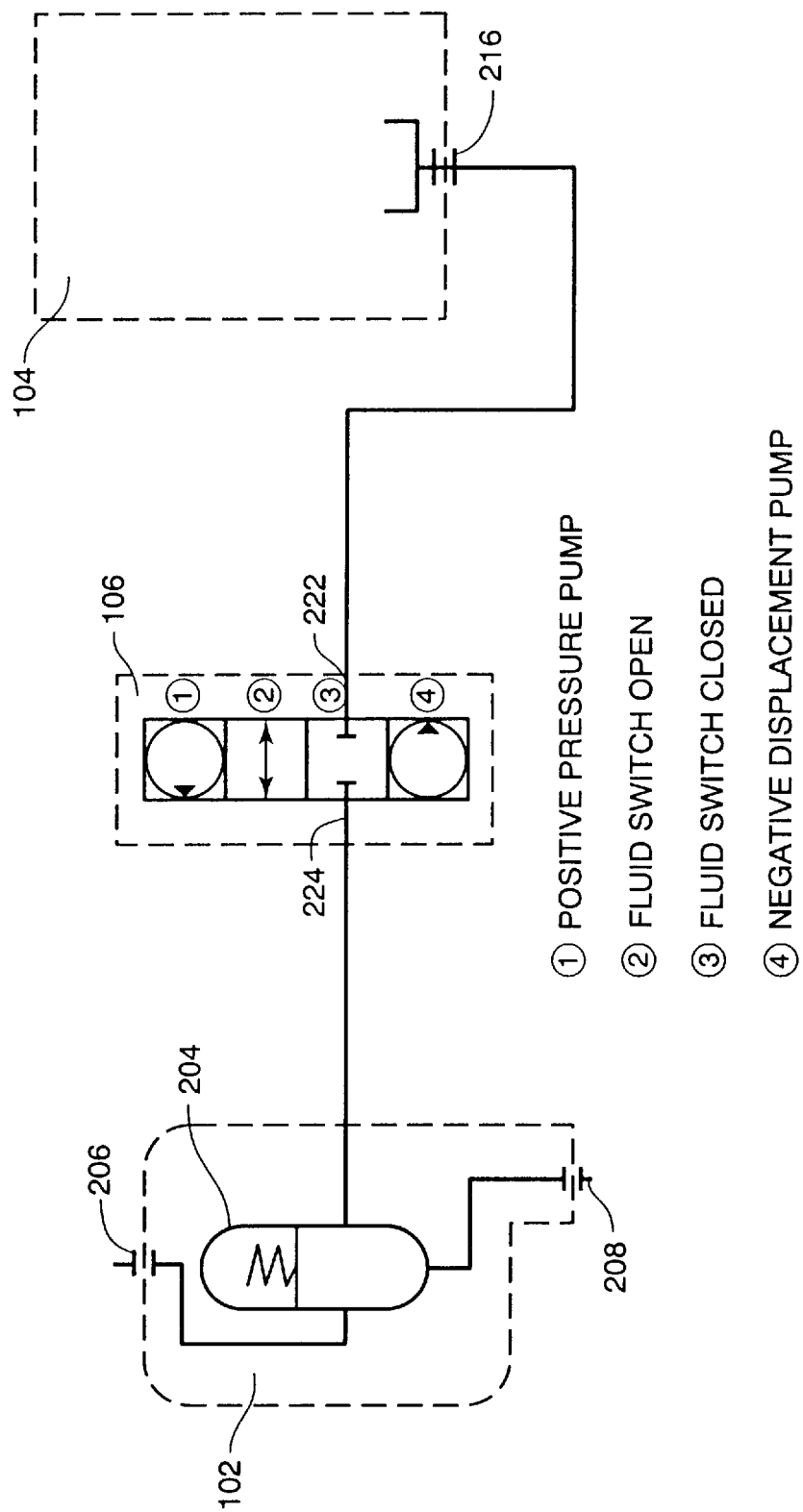
FIG. 4 is a graphical symbol diagram of the present invention as shown in FIGS. 1 and 2 indicating four operation modes of the ink pump and flow switch component.

FIGS. 3A through 3D facilitate the description of the subcomponents of the ink pump and flow switch device 106 and, in conjunction with FIG. 4, the operation of the present invention. The piston head 236 (FIG. 2) includes a primary seal 304 and a secondary seal 302, each coupled to the piston shaft 232. The seals 302, 304 are fabricated of an elastomer, such as fluorosilicone, or the like, which is impermeable and non-reactive to inks of the type used in an ink-jet system. The seals 302, 304 are fixedly mounted to the piston shaft 232 in any manner suited to manufacture of the ink pump and flow switch device 106, such as by fitting each seal 302, 304 onto flanges 306, 308, respectively, provided on the piston shaft 232 in a suitable manner as would be known in the art. Note that a gap, "g," between the primary seal 304 and the secondary seal 302 forms a between-seal cavity 310 separating the seals 302, 304. The secondary seal 302 is provided with a bore 312 that forms a fluid channel extending from the between-seal cavity 310 to a region 230' of the central chamber 230 within the cylinder 220 adjacent the ink pumping port 224 of the casing 218. Otherwise, the seals 302, 304 form fluid tight barriers within said central chamber 230. Note that the piston head 236 is selectively positionable. The piston head 236, including the secondary seal 302, having the ink flow channel therethrough, and the primary seal 304, is mounted on the piston shaft 232 with a predetermined gap "g" in between the seals 302, 304 such that a predetermined volumetric region is defined by the gap width and the shape and dimensions of the seals 302, 304.

In operation, the ink pump and flow switch device 106 and off-axis ink reservoir 104 are stationary, while the pen 102 is mounted on a carriage (not shown) and traverses a page of print medium (not shown) during printing. (However, note that the present invention is also readily adapted to stationary, pagewide, printhead mechanisms.) The pen 102 contains a spring loaded ink accumulator 204 to maintain a predetermined design back-pressure at the printhead 208. The ink accumulator 204 is in fluidic communication with the off-axis ink reservoir 104 via the ink pump and flow switch device 106 and ink conduits 108, 110.

During a printing cycle, the ink pump and flow switch device 106 is closed as depicted in FIGS. 3C and FIG. 4, position 3. Ink flow between the off-axis ink reservoir 104 and the ink accumulator 204 is cut-off.

When the pen 102 is low on ink (determined by counting drops printed, a mechanical or electromechanical ink level detection mechanism, or the like as would be known in the art [see for example, U.S. Pat. No. 4,931,813 ((Hamlin) assigned to the common assignee of the present invention and incorporated herein by reference)], the printing cycle is interrupted, if necessary, and the ink pump and flow switch device 106 is changed to the open position as depicted in FIG. 3A (see also FIG. 4, position 2). Note that in the open position ink is free to flow out of the off-axis ink reservoir 104 via outlet port 216 and tubing 108 through the inlet port 222 of the cylinder 220 into the between-seal cavity 310. When nearly full, from the between-seal cavity 310 ink can only flow through the bore 312, that is, the fluid channel through the secondary seal 302, into a region 230' of the central chamber 230 of the cylinder 220 that includes the ink pumping port 224. Ink then passes through the ink pumping port 224, through the tubing 110, and through the ink transfer port 210 of the pen 102 where it fills the ink accumulator 204.

Note that the pen essentially refills itself from the off-axis ink reservoir 104 by using the potential energy that has been stored in the flexed internal spring of the ink accumulator 204 as the ink was depleted from the accumulator 204 during the previous printing cycle or cycles. Normally, this refilling activity will take place between print jobs when the carriage parks the pen 102 in a service station mechanism (not shown).

In the main, the refill time will be the amount of time required for the spring loaded accumulator 204 to go from "empty" to "full" after the ink pump and flow switch device 106 has been opened. Refill time will be governed by the design specifications of the component parts (e.g., ink accumulator size, spring constant, and the like), the relative orientation of the parts within the hard copy apparatus (e.g., the length of the ink conduits), ink viscosity, and the like, as would be known by a person skilled in the art using flow calculations based upon Poiseuille's Law.

When the ink accumulator 204 has refilled itself in this manner, the ink pump and flow switch device 106 is actuated (see arrow labelled "PULL" in FIG. 3B; see also FIG. 4, position 4) to pump backwards, withdrawing enough ink from the accumulator 204 via the tubing 110 into the central chamber region 230' of the cylinder 220 to load the spring inside the accumulator 204 and establish the predetermined design back-pressure at the printhead 208 for proper printing operation. This ink pump back action can be calculated or experimentally tailored to a specific pen 102 to establish the negative displacement of the piston head 236 needed to establish the predetermined design back-pressure at the printhead 208. Following the resetting of the design back-pressure, printing can again be initiated.

Ink-jet hard copy apparatus generally provide the user with an mechanism for priming the printhead when print quality appears degraded. Usually the printhead is primed by forcing a small amount of ink through each of the nozzles (performed at a provided hard copy apparatus service station as would be known to a person skilled in the art). Additionally, air in the pen or accumulated gases in the ink mechanism should be occasionally purged to prevent interference with the printhead operation. The ink pump and flow switch device 106 is also used to provide a positive pressure (see arrow labelled "PUSH" in FIG. 3D; see also FIG. 4, position 1) which can prime the printhead and also purge the ink accumulator 204 of air or other gases through the nozzles if air bubbles have accumulated nearby or through a purge vent 206 using a bubble generator, check valve, or the like, as would be known in the art (see for example, U.S. patent application Ser. No. 08/519,384 (Hall), attorney docket 1093634-1, assigned to the common assignee of the present invention and incorporated herein by reference) . Basically, a gas purge mechanism is coupled to the ink accumulator 204 at a high point thereover relative to the local horizontal such that free gases and gas saturated ink within said accumulator rise to the purge mechanism where the gases are removed. This feature can be eliminated if gas accumulation is not a problem in a specific pen design.

The size of the ink pump and flow switch device is determined by the amount of ink that must be pushed into the ink accumulator, if desired, for priming and gas purge, and the amount of ink that must be retracted after equalization to establish sufficient back-pressure at the printhead. In other words, the ink pump and flow switch device must pull a predetermined volume of ink from the accumulator to reset the design back-pressure; the ink pump and flow switch device must push a predetermined volume of ink into the accumulator to prime the nozzles and to purge gases from the pen. Note that the ink pump and flow switch device can be designed to have the piston head have a first positive pressure stroke distance only to prime the printhead and a second positive pressure stroke distance, greater than the first, to purge gases from the pen. The maximum stroke of the piston should of course provide less pressure than that which could damage the printhead since it is generally a relatively delicate component fabricated in the manner of a semiconductor device. Similarly, the spring bag will also have a limited positive pressure holding capacity which must be accounted for the the specific pen design. Pumping volumes can be determined experimentally for a given pen design, depending on such factors as the spring constant, accumulator volume, ink bag film thicknesses and elasticity, tubing size and elasticity, swept volume of ink, and the like, as would be apparent to a person skilled in the art.

The present invention provides an off-axis ink delivery system for an ink-jet hard copy apparatus. A multifunctional ink pump and flow switch device is employed to accomplish all the necessary functions for operation of a spring loaded accumulator pen and leverages the spring force provided in the pen to eliminate the need for positive pressure force in the off-axis ink reservoir. Once the accumulator has refilled itself completely, and a small amount of ink has been withdrawn to establish back-pressure at the printhead, the pen is ready to print with a known amount of ink available on-board. From this point, the hard copy apparatus can monitor the amount of ink depleted during printing. When a predetermined fraction or less of ink remains in the accumulator during or, preferably, after a printing job, the carriage moves the pen to the refill position and the refill process repeats.

Note that if for any reason hard copy printing operation is interrupted, the ink delivery system can reset itself to a known position by going through the refill process described above. This would typically be the case at a power-up cycle. The refill procedure could be done more frequently than necessary to insure that the ink accumulator is always nearly full. Ideally, refill activity would take place between print batches to minimize an effect on hard copy throughput.

Note, however, that while refill activity would normally take place while the pen is parked at a service station between print batch jobs, it is possible to refill during printing. This could be important in the large format graphics market, where long, uninterrupted print jobs may be required. An estimate of the rate of ink coming into the accumulator when the ink pump and flow switch is in the open position can be calculated for a given pen based on determined pressure losses in the ink delivery system and the backpressure at the printhead. The hard copy apparatus microprocessor or application specific integrated circuit controller could track on-axis ink volume by subtracting expended ink (counting drops jetted) from the refilled ink volume and then adding the amount of ink refilled while the multi-functional ink pump and flow switch is positioned for the free flow of ink from the reservoir to the pen during the print job.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. For example, other pump-switch device designs can be made to perform the four functional modes as described earlier. The present invention can be adapted to ink-jetting mechanisms other than thermal ink-jet printhead designs. Additionally, the accumulator may be a back-pressure regulator of a different design than the spring-bag type. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. An ink delivery system for a hard copy apparatus, comprising:

ink-jetting means, mounted within said hard copy apparatus and including a printhead and an ink accumulator coupled to said printhead providing printhead back-pressure regulation, for jetting ink onto print media adjacent thereto;

off-axis ink storage means for containing a supply of ink for said ink-jetting means; and ink pumping and flow switching means, fluidically coupling said ink-jetting means and said off-axis ink storage means, for selectively controlling refilling of said ink accumulator and for selectively resetting said ink accumulator to a predetermined back-pressure set point following refilling of said ink accumulator, wherein said ink pumping and flow switching means includes selectively positionable piston means for controlling the flow of ink from said ink storage means and for controlling the direction of flow of ink to and from said ink-jetting means, said piston means having a piston head, including a first sealing member and a second sealing member, said second sealing member having an ink flow channel therethrough, wherein said piston means is mounted on a piston shaft with a gap between said first sealing member and said second sealing member such that a predetermined volumetric region is defined by said gap and predetermined shape and dimensions of said first sealing member and said second sealing member, and said ink pumping and flow switching means further having housing means having a central chamber for retaining said piston means therein, an ink inlet port coupled to said ink storage means positioned such that said first sealing member and said second sealing member are selectively positionable to open and close said ink inlet port on demand, and an ink pumping port coupled to said ink accumulator such that ink flow is permitted from said ink storage means into said gap, through said ink channel, and through a region of said central chamber adjacent said ink pumping port to said pumping port, such that ink is transferred from said ink storage means to said accumulator when said piston means is at a first predetermined position with said gap open to said ink inlet port.

2. The system as set forth in claim 1, wherein said ink pumping and flow switch means further comprises:

means for selectively exerting a predetermined positive pressure within said ink accumulator to prime said printhead and to purge gases from said ink-jetting means.

3. The system as set forth in claim 1, further comprising:

a second predetermined position for said piston means such that said inlet port is blocked by said second sealing member such that ink flow from said ink storage means into said gap is blocked.

4. The system as set forth in claim 3, further comprising:

said piston means is positioned within said central chamber such that the volume swept within said central chamber by said second sealing member between said first predetermined position and said second predetermined position defines a predetermined volume of ink retracted from said ink accumulator to establish said predetermined back-pressure set point at said printhead when said piston means is moved from said first predetermined position to said second predetermined position.

5. The system as set forth in claim 4, further comprising:

a third predetermined position for said piston means within said central chamber such that said first sealing member blocks said ink inlet port whereby a volume swept within said central chamber in moving said piston from said second position to said third predetermined position and said predetermined volumetric region of said gap establishes a predetermined positive pressure within said ink accumulator.

6. The system as set forth in claim 1, wherein said ink storage means is a static ink containment means for allowing ink therein to be withdrawn therefrom under influence of said ink accumulator when said piston means is in said first predetermined position.

7. The system as set forth in claim 1, said off-axis ink storage means further comprising:

a static ink containment device from which ink is withdrawn by said predetermined backpressure into said ink accumulator through said ink pumping and flow switch device when said ink pumping and flow switch means is selectively positioned to an open position and wherein ink not withdrawn is retained as a reserve supply of ink when said ink pumping and flow switch means is selectively positioned to a first closed position.

8. The system as set forth in claim 7, wherein said ink pumping and flow switch means withdraws a predetermined volume of ink from said accumulator via a fluidic coupling into a region of said ink pumping and flow switch means when said ink pumping and flow switch means is repositioned from said open position to said first closed position such that said predetermined back-pressure is established at said printhead.

9. The system as set forth in claim 8, wherein said ink-jetting means further comprises:

at least one ink-jet pen having a gas purge mechanism coupled to said ink accumulator at a high point thereover relative to the local horizontal such that free gases and gas saturated ink within said accumulator rise to said purge mechanism.

10. The system as set forth in claim 9, wherein said ink pumping and flow switch means is selectably positional to at least one second closed position in which ink in a predetermined volume of said ink pumping and flow switch means is forced through said fluidic coupling into said accumulator creating at least one predetermined positive pressure that primes said printhead.

11. The system as set forth in claim 10, wherein said ink pumping and flow switch means is selectably positional to at least another second closed position such that a greater predetermined volume of ink in said ink pumping and flow switch means is forced through said first fluidic coupling means into said accumulator creating a larger positive pressure than said at least one predetermined positive pressure such that said larger positive pressure purges gases within said accumulator and saturated within ink in said accumulator via said gas purge mechanism.

12. The system as set forth in claim 1, wherein said off-axis ink storage means is selected from a group comprising:

refillable ink containment devices and replaceable ink containment devices.

13. The system as set forth in claim 1, further comprising:

a redundant said system being installed in said hard copy apparatus for each color ink employed in said hard copy apparatus.

* * * * *